United States Patent [19]

Koons

[11] 4,019,497

[45] Apr. 26, 1977

[54] FRYING PAN GREASE SHIELD

[76] Inventor: Margaret R. Koons, 1300 Dorsh Road, South Euclid, Ohio 44121

[22] Filed: Oct. 30, 1975

[21] Appl. No.: 627,073

[52] U.S. Cl. .......................................... 126/299 C
[51] Int. Cl.$^2$ ........................................ F24C 15/00
[58] Field of Search ............................... 126/299 C

[56] References Cited

UNITED STATES PATENTS 2,248,216  7/1941  Bukoski ......................... 126/299 C
2,623,516  12/1952  Salem ............................ 126/299 C Primary Examiner—Robert G. Nilson
Attorney, Agent, or Firm—Baldwin, Egan, Walling & Fetzer

[57] ABSTRACT

A frying pan grease shield is presented consisting of an integral imperforate hollow shell having a planar open bottom edge having a top and surrounding walls on three sides extending down to the bottom edge and leaving one side open where the frying pan handle will stick out. A continuous grease accumulation trough surrounds the bottom edge on the inner side and the top and walls are inclined so that hot fat or grease will flow by gravity along the top and walls and into the trough.

1 Claim, 4 Drawing Figures

FRYING PAN GREASE SHIELD

BACKGROUND OF THE INVENTION

In frying food in a pan on top of a stove, it will well known that hot fat and grease splatters out of the pan and after the cooking is done, there is a clean up job necessary on the top of the stove.

It is an object of the present invention to provide a simple unitary imperforate grease shield, the walls of which will surround the frying pan on three sides and on the top so as to catch the spatterings of hot grease in all directions except on the one open side of the shield, and direct the hot fat or grease into an accumulating trough which extends around the bottom edge of the shield.

Other objects and advantages of the invention will be apparent from the accompanying drawings and description and the essential features will be set forth in the appended claims.

In the drawings,

FIG. 3 is an end elevational view taken at the left-hand end of FIG. 1; while

Figure 1:
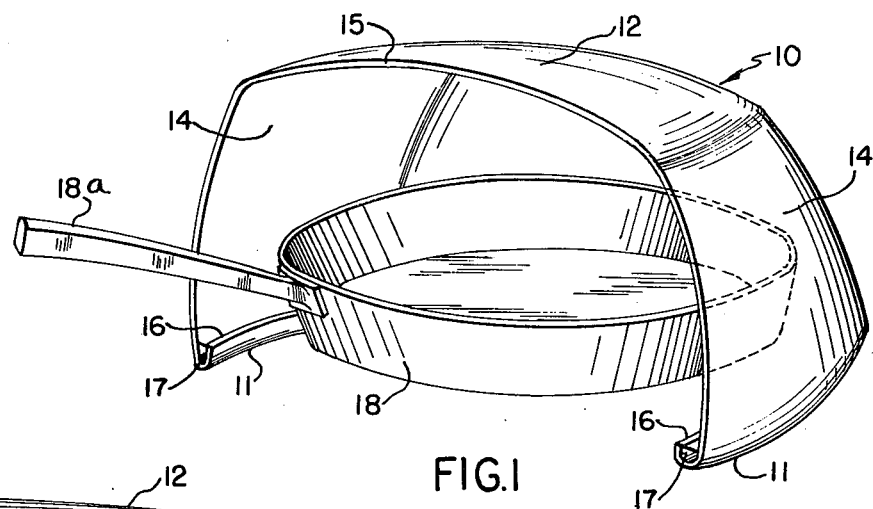
FIG. 1 is a perspective view showing the shield in position on top of the stove substantially surrounding a frying pan.

Referring to the drawings, the frying pan grease shield of this invention indicated at 10 consists of a unitary imperforate hollow shell made of stiff sheet material which might be of aluminum, sheet metal, stainless steel, fire-proof molded plastic, or the like. The shield has a planar open bottom edge 11, a top 12, one end wall 13, and two generally parallel side walls 14 connected with the top and extending down to said bottom edge. The end 15 opposite the end 14 is entirely open between the bottom edge and the top and side walls providing a space for the handle of a frying pan to extend out and giving room for the cook to get at the food being cooked in the pan.

Referring to the various Figures of the drawings, it will be seen that the shield 10 slopes slightly outwardly and downwardly from the front center of the top 12 in opposite directions to the side walls 14 and rearwardly toward the end wall 13. Then the side walls and the end wall slope outwardly and downwardly from the top 12 to the bottom edge of the back 13 and of the side walls 14 sufficiently to cause gravity flow of hot grease downwardly and outwardly along said walls.

Figure 2:
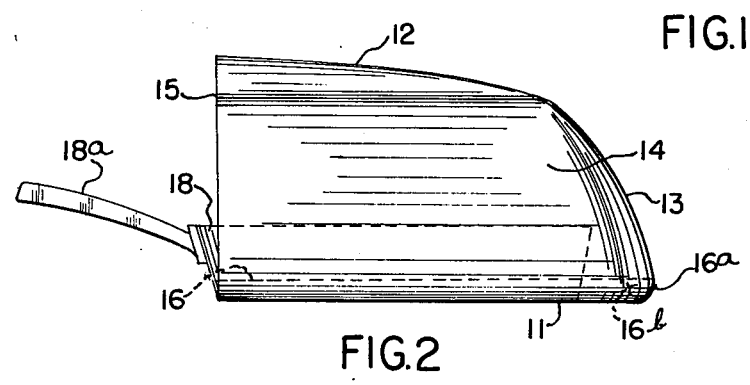
FIG. 2 is a side elevational view of the shield seen in FIG. 1.
Figure 3:
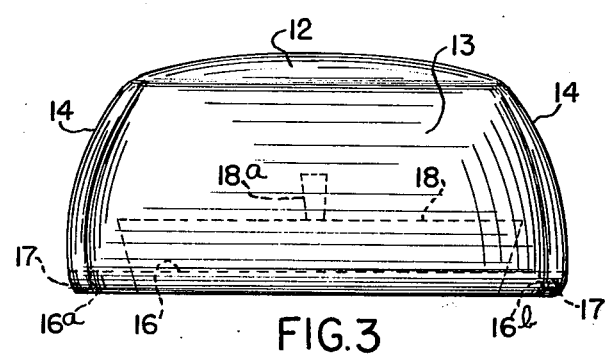

An accumulation trough 16 is provided extending continuously around two side walls and the end wall and this trough is bent inwardly at 16a, as seen in FIGS. 2 and 3, and then upwardly at 16b to provide a trough to catch the hot grease draining along the inside of the top and down the inside of the side walls to flow smoothly into the trough. This trough may have reasonably small dimensions, usually not being over about 1 inch wide and about 1 inch deep. Partitions 17 close the ends of the trough 16 at the open side 15 of the shield. The smooth rounded bottom surface of the trough 16 slides evenly over a stove top without marring the same.

Figure 4:
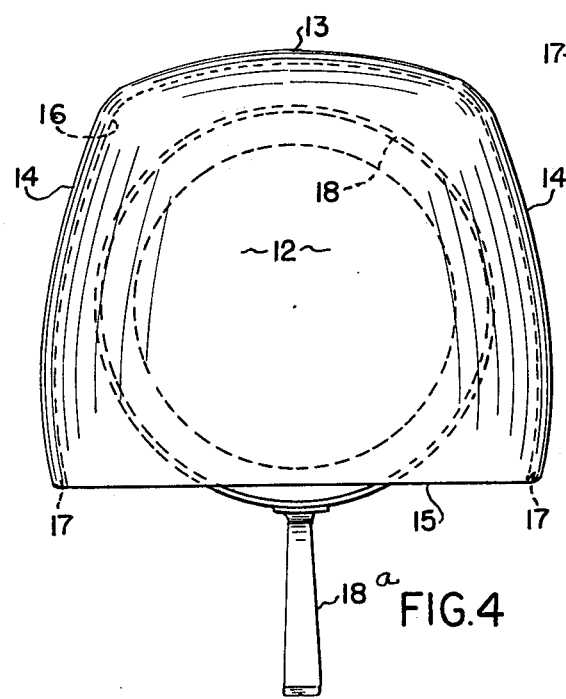
FIG. 4 is a top plan view of the shield indicating in dot-dash lines the position of the accompanying frying pan.

A frying pan 18 is shown in dot-dash lines in FIGS. 2, 3 and 4 and in full lines in FIG. 1, and having a handle 18a extending out the open end 15 of the shield.

The inclination of the top and side walls of the shield of this invention may vary somewhat but, as shown in the drawings, the top 12 may slope at an angle between about 5° and 10° to the horizontal from the center toward the side walls and say from 5° to 15° or 20° from the front to rear of the top 12 as seen in FIG. 2. The side walls 14 are sloped outwardly and downwardly, preferably slightly curved convexly outward as seen in FIGS. 1, 2 and 3, and the angle with respect to a vertical, as seen in FIGS. 2 and 3, starts out from the top at an angle of about 30° or 40° to the vertical and ends up near the bottom edge at approximately at the vertical.

In practice, this shield would be made in different sizes, say for 8 inch, 10 inch or 12 inch frying pans and would be given a baked enamel finish in popular kitchen colors.

What is claimed is:

1. A frying pan grease shield consisting of an integral imperforate hollow shell having a planar open bottom edge and a top, and one end wall and two generally parallel side walls connected with said top and extending to said bottom edge, and the end opposite said one end being entirely open between said bottom edge and said top and side walls, and a continuous grease accumulation trough bent smoothly inward and then upward around said bottom edge along said side walls and one end wall, said trough having a continuous open top along its entire length and having partitions closing the ends of said trough at the open end of said shield, said shield sloping slightly outwardly and downwardly from the front center of said top to said side walls and end wall, and sloping outwardly and downwardly from top to bottom edge of said side walls and end wall to said trough sufficiently to cause gravity flow of hot grease along said walls to said trough.

* * * * *